M. C. Gardner.
Chuck for Metal Planer.
Nº 66,014.  Patented Jun. 25, 1867.
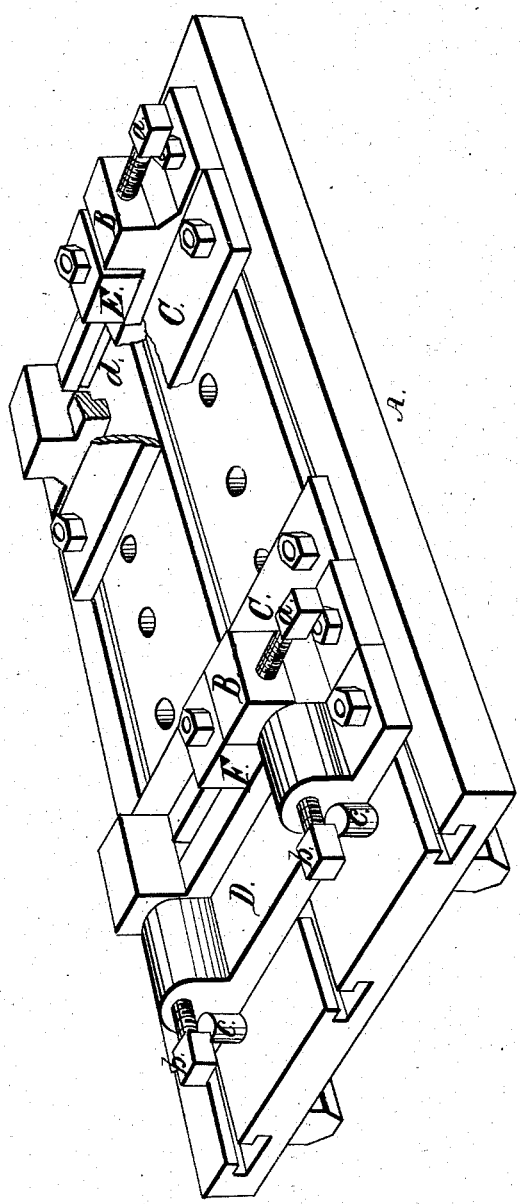
Witnesses:
H. C. Wilson
Geo. Bradshaw
Inventor:
M. C. Gardner

UNITED STATES PATENT OFFICE.

MITCHELL C. GARDNER, OF ROCHESTER, NEW YORK.

IMPROVED CHUCK FOR IRON-PLANING.

Specification forming part of Letters Patent No. 66,014, dated June 25, 1867.

*To all whom it may concern:*

Be it known that I, MITCHELL C. GARDNER, of the city of Rochester, in the county of Monroe and State of New York, have invented certain new and useful Improvements in Chucks for Iron-Planing; and I do hereby declare that the following is a full and exact description thereof, reference being had to the accompanying drawings, making part of the specification, and to the letters of reference marked thereon, same letters referring to like parts in the drawings.

In said drawings, letter A is a perspective view of the planer bed or table, with grooves and pin-holes, in the ordinary way. Letters B B are perspective views of the jaws, having grooves, with check-blocks E E, and driving-screws *a a*. Letters *c c* are two drop-pieces, with check-bolts running in the outside grooves of the table, to be used whenever it becomes necessary to chuck any small piece down on the bed of the table, the stroke of the planer working between the jaws B B. Letter D is a bracket or support back of one of the main jaws, with driving-screws *b b*, for the purpose of forcing the main jaws and drop-pieces together lengthwise of the table.

The nature of my invention consists in the sliding jaws B B, to chuck a piece of any length longitudinally on the planer-table, and at the same time contract down to any length desired, and, with the combination of the sliding jaws B B and the support D, to chuck any piece endwise or crosswise the table, between the jaws B B or the drop *c c*, the stroke of the planer working between the jaws B B when it becomes necessary to use the drop-pieces *c c*; and that the component parts of this device are adjustable with great facility, for the chucking or fastening any piece for planing in line longitudinally or at a right angle at once, thereby facilitating the work to be done to a great extent. For planing long, light pieces, one or more of the jaws B B may be inserted, if required.

Having thus fully described my invention, what I claim as my invention, and desire to secure by Letters Patent, is—

The sliding jaws B B and the bracket or support D, back of one of the jaws B B, to chuck lengthwise the table, and at the same time using the jaws B B for chucking both crosswise and lengthwise the whole length of the table, in combination, substantially as specified, and for the purposes set forth.

In witness whereof I have hereunto subscribed my name the 26th day of November, 1866.

M. C. GARDNER. [L. S.]

Witnesses:
F. C. WILSON,
GEO. BRADSHAW.